US008316100B2

(12) United States Patent
Essenmacher et al.

(10) Patent No.: US 8,316,100 B2
(45) Date of Patent: Nov. 20, 2012

(54) AUTONOMIC CORRECTION OF INCORRECT IDENTITIES IN REPOSITORIES

(75) Inventors: Michael D. Essenmacher, Red Hook, NY (US); Thomas E. Murphy, Jr., Hopewell Junction, NY (US); Francis A. Pflug, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 12/134,238

(22) Filed: Jun. 6, 2008

(65) Prior Publication Data

US 2009/0307271 A1 Dec. 10, 2009

(51) Int. Cl.
*G06F 15/16* (2006.01)

(52) U.S. Cl. ........ 709/217; 709/204; 709/205; 709/206; 709/207; 707/609; 707/690; 707/691

(58) Field of Classification Search .................. 709/204, 709/205, 206, 207, 217; 707/609, 690, 691
See application file for complete search history.

(56) References Cited

U.S. PATENT DOCUMENTS

| | | | |
|---|---|---|---|
| 6,564,264 B1 * | 5/2003 | Creswell et al. ............. | 709/245 |
| 6,684,238 B1 | 1/2004 | Dutta | |
| 7,337,448 B1 * | 2/2008 | Dalia et al. .................... | 719/328 |
| 7,430,580 B2 | 9/2008 | Baratakke et al. | |
| 2002/0023181 A1 | 2/2002 | Brown et al. | |
| 2002/0042815 A1 * | 4/2002 | Salzfass et al. ............. | 709/206 |
| 2002/0087647 A1 | 7/2002 | Quine et al. | |
| 2002/0143879 A1 * | 10/2002 | Sommerer ................... | 709/206 |
| 2002/0188683 A1 | 12/2002 | Lytle et al. | |
| 2003/0110223 A1 * | 6/2003 | Hamilton et al. ............. | 709/206 |
| 2003/0135567 A1 * | 7/2003 | Reilly ........................... | 709/206 |
| 2004/0181586 A1 | 9/2004 | Morreale et al. | |
| 2004/0215726 A1 * | 10/2004 | Arning et al. ................. | 709/206 |
| 2004/0249951 A1 | 12/2004 | Grabelsky et al. | |
| 2005/0278430 A1 | 12/2005 | Cato | |
| 2006/0031772 A1 | 2/2006 | Valeski | |
| 2007/0050456 A1 | 3/2007 | Vuong et al. | |
| 2007/0106731 A1 | 5/2007 | Bhakta et al. | |
| 2007/0124394 A1 | 5/2007 | Farrell et al. | |
| 2008/0021962 A1 | 1/2008 | Ryan et al. | |
| 2008/0040432 A1 | 2/2008 | Murphy et al. | |
| 2008/0071867 A1 | 3/2008 | Pearson et al. | |
| 2008/0104075 A1 | 5/2008 | Heumesser | |
| 2008/0104190 A1 | 5/2008 | Morreale et al. | |
| 2008/0133677 A1 | 6/2008 | Pattabhiraman et al. | |
| 2008/0168373 A1 | 7/2008 | Wilson | |

(Continued)

OTHER PUBLICATIONS

Network Working Group Request for Comments 2822, P. Resnick, Apr. 2001.

(Continued)

*Primary Examiner* — Harunur Rashid
(74) *Attorney, Agent, or Firm* — William A. Kinnaman, Esq.; Kevin P. Radigan, Esq.; Heslin Rothenberg Farley & Mesiti P.C.

(57) ABSTRACT

Autonomic correction of incorrect identities in repositories. A communication is prepared and sent to one or more recipients. In response thereto, a notification is provided to the sender that one or more of the recipient's identities is incorrect. Based on this notification, corrective action is automatically initiated in order to locate the repository, and in particular, an entry in the repository corresponding to the incorrect identity and to take action to correct that identity.

16 Claims, 8 Drawing Sheets

U.S. PATENT DOCUMENTS

2008/0301454 A1  12/2008  Malcolm et al.
2009/0089382 A1   4/2009  Garrett
2009/0094335 A1   4/2009  Edmonds et al.
2009/0132664 A1   5/2009  Radenkovic et al.
2009/0182824 A1   7/2009  Haynes et al.
2009/0240657 A1   9/2009  Grigsby et al.

OTHER PUBLICATIONS

Network Working Group Request for Comments 3464, K. Moore, G. Vaudreuil, Jan. 2003.
Office Action for U.S. Appl. No. 12/134,248 dated Jun. 8, 2010.
Office Action for U.S. Appl. No. 12/134,246 dated May 10, 2010.
Office Action for U.S. Appl. No. 12/234,242 dated May 4, 2010.
Final Office Action for U.S. Appl. No. 12/134,242 dated Oct. 13, 2010.
Final Office Action for U.S. Appl. No. 12/134,246 dated Oct. 25, 2010.
Final Office Action for U.S. Appl. No. 12/134,248 dated Dec. 2, 2010.
Office Action for U.S. Appl. No. 121134,248 (U.S. Patent Publication No. 2009/0307317 A1), dated Mar. 15, 2011.

* cited by examiner

200

202 — To: Mary Smith <mary@example.net>, Jack Smith<jack@example.net>,
John Brown<jbrown@nowheres.org>

204 — cc: John Doe<doej@example.net>, Lisa Riley<lriley@somewhere.org>,
Fred Blue<fblue@example.net>, Steve Wolf<swolf@anywhere.net>

206 — bcc:

208 — Subject: New Security Exploit

209 — Message-ID: <msg0087@local.machine.example>

210 — Body of Message

222 — To: jpublic@charter.net
224 — From: postmaster@nowheres.org
226 — Subject: Delivery Notification (failure) for jbrown@nowheres.org
228 — Content-Type: multipart/report; report-type=delivery-status;
       boundary=bcdef
MIME-Version: 1.0

--bcdef
Content-type: text/plain; charset=us-ascii

Your message (id msg0087@local.machine.example) could not be
delivered to
jbrown@nowheres.org A transcript of the session follows:

(while talking to nowheres.org)
>>> RCPT TO:<jbrown@nowheres.org> NOTIFY=FAILURE
<<< 550 error - no such recipient --bcdef
Content-type: message/delivery-status Reporting-MTA: dns; nowheres.org
Original-Envelope-ID: msg0087@local.machine.example Original-Recipient: rfc822;jbrown@nowheres.org
Final-Recipient: rfc822; jbrown@nowheres.org
SMTP-Remote-Recipient: jbrown@nowheres.org
Diagnostic-Code: smtp; 550 error - no such recipient
Action: failed
Status: 5.0.0

--bcdef
Content-type: message/rfc822

From: Joe Public <jpublic@charter.net>
    To: Mary Smith <mary@example.net>, Jack Smith <jack@example.net>, John
       Brown<jbrown@nowheres.org>
    Cc: John Doe<doej@example.net>, Lisa Riley<lriley@somewhere.org>, Fred
       Blue <fblue@example.net>, Steve Wolf<swolf@anywhere.net>
    Subject: New Security Exploit
221 — Date: Fri, 21 Nov 1997 09:55:06 -0600
    Message-ID: <msg0087@local.machine.example>

--bcdef--

252 — To: jpublic@charter.net
254 — From: postmaster@nowheres.org
256 — Subject: Delivery Notification (failure) for jbrown@nowheres.org
258 — Content-Type: multipart/report; report-type=delivery-status;
         boundary=bcdef
MIME-Version: 1.0

--bcdef
Content-type: text/plain; charset=us-ascii

Your message (id msg0087@local.machine.example) could not be delivered to
jbrown@nowheres.org A transcript of the session follows:

(while talking to nowheres.org)
>>> RCPT TO:<jbrown@nowheres.org> NOTIFY=FAILURE
<<< 550 error - no such recipient --bcdef
Content-type: message/delivery-status Reporting-MTA: dns; nowheres.org
Original-Envelope-ID: msg0087@local.machine.example Original-Recipient: rfc822;jbrown@nowheres.org
Final-Recipient: rfc822; jbrown@nowheres.org
SMTP-Remote-Recipient: jbrown@nowheres.org
Diagnostic-Code: smtp; 550 error - no such recipient
Action: failed
Status: 5.0.0

--bcdef
Content-type: message/rfc822

From: Joe Public <jpublic@charter.net>
   To: Mary Smith <mary@example.net>, Jack Smith <jack@example.net>, John
       Brown<jbrown@nowheres.org>
   Cc: John Doe<doej@example.net>, Lisa Riley<lriley@somewhere.org>, Fred
       Blue <fblue@example.net>, Steve Wolf<swolf@anywhere.net>
260 — X-Addr-List: mary@example.net/sec-list@server1.charter.net,
                jack@example.net/sec-list@server1.charter.net, jbrown@nowheres.
262 —           org/sec-list@server1.charter.net, doej@example.net/my-list@local,
                lriley@somewhere.org/my-list@local, fblue@example.net/@local
   Subject: New Security Exploit
   Date: Fri, 21 Nov 1997 09:55:06 -0600
   Message-ID: <msg0087@local.machine.example>

--bcdef--

FIG. 2C

AUTONOMIC CORRECTION OF INCORRECT IDENTITIES IN REPOSITORIES

TECHNICAL FIELD

This invention relates, in general, to communications that include incorrect identities of recipients or others, and in particular, to automatically initiating correction of repositories that include the incorrect identities.

BACKGROUND OF THE INVENTION

There are various modes of communication used today, including telephonic communication, facsimile communication, and electronic communication, as examples. In recent years, electronic communication has become a preferred medium of communication for many businesses and individuals. Electronic communication includes electronic mail, also known as email or e-mail, and instant messaging, as examples. The preference for electronic communication stems from the many advantages that are provided by this mode of communication. People have always wanted to correspond with one another in the fastest way possible. Electronic mail is advantageous over regular mail in this respect as it provides a near instantaneous form of communication. Prior to e-mail, first telegraph, and then later facsimile, provided similar instantaneous forms of communication, but in both instances, the steps leading to sending and then ultimately steps involved in receiving this instant communication were burdensome. By contrast, once means of communication is established, electronic mail or other electronic communications do not provide any additional burdens either for the sender sending the communication or the receiver receiving the communication.

In many instances, electronic communication is taking the place of telephone or is even preferred to it. While affording the same ease and instantaneous means of communication as a telephone, electronic communication is preferred in instances where there is an advantage to recording the communication. For example, documentation of communications may be required or at least preferred in instances where such documentation provides legal protection to one or both parties. But even in situations where such documentation is not necessary, written documentation affords better information retention. For example, it may be easier to organize and retain information about a client's new address and phone number when such information is provided by stored electronic means that can be easily retrieved as opposed to other means that can be more easily misplaced.

The popularity of electronic communication has led both individuals and businesses to rely heavily on this form of communication. Electronic communication allows people to write back and forth without having to spend much time worrying about how the message actually gets delivered. As technology grows closer and closer to being a common part of daily life, the reliance of both individuals and businesses on this medium of communication is sharply increasing.

Electronic communications rely on addresses to send/receive messages. For instance, an e-mail address provides the information required to get a message to a user or businesses anywhere around the world. Other forms of electronic communications, as well as other forms of communication, also rely on addresses or other forms of identity.

Unfortunately, there are instances where the message contained in a communication is not delivered to the intended recipient because the identity (e.g., address) is incorrect. When an identity is incorrect, the intended recipient of the communication does not receive the communication. This is troublesome for the original sender of the communication, as well as to others that may be relying on that communication, such as those carbon copied in the cc:, blind carbon copied in the bcc:, or other recipients in the to: header.

SUMMARY OF THE INVENTION

Based on the foregoing, a need exists for a capability to determine that an identity indicated in a communication is incorrect and to automatically initiate correction of that identity in one or more repositories that maintain that identity.

The shortcomings of the prior art are overcome and additional advantages are provided through the provision of a method to facilitate correction of identities indicated in communications. The method includes, for instance, determining that an identity specified in a communication sent by a sender to one or more receivers is incorrect; and automatically initiating correction of the incorrect identity in a repository in which the identity is maintained.

Systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2A depicts one example of a communication to be sent to a plurality of receivers, in accordance with an aspect of the present invention;

FIG. 2B depicts one example of a delivery failure notification, in accordance with an aspect of the present invention;

FIG. 2C depicts another example of a delivery failure notification, in accordance with an aspect of the present invention;

DETAILED DESCRIPTION OF THE INVENTION

In accordance with an aspect of the present invention, a capability is provided to detect that one or more identities of a communication are incorrect and to automatically initiate correction in one or more repositories of the one or more incorrect identities. As used herein, an identity is any type of information that indicates where a communication is to be sent or otherwise identifies how to locate a user, including, but not limited to, an e-mail address, a buddy indication, an indication stored in a phone directory, or other types of addresses used in communication and stored in a repository. Further, as used herein, a repository includes an address book, a distribution list, a buddy list (e.g., an Instant Message Buddy list), a list, a directory, or any other type of mechanism that stores identities for later retrieval. The repository can be shared by a plurality of users or other entities or not shared. As particular examples, a repository is a Lotus® Domino® address book, a Microsoft® Outlook address book, an LDAP (Lightweight Directory Access Protocol) directory, etc. Lotus® and Domino® are registered trademarks of International Business Machines Corporation, and Microsoft® is a registered trademark of Microsoft Corporation, Redmond, Wash. Other names used herein may be registered trademarks, trademarks or product names of International Business Machines Corporation or other companies.

Figure 1:
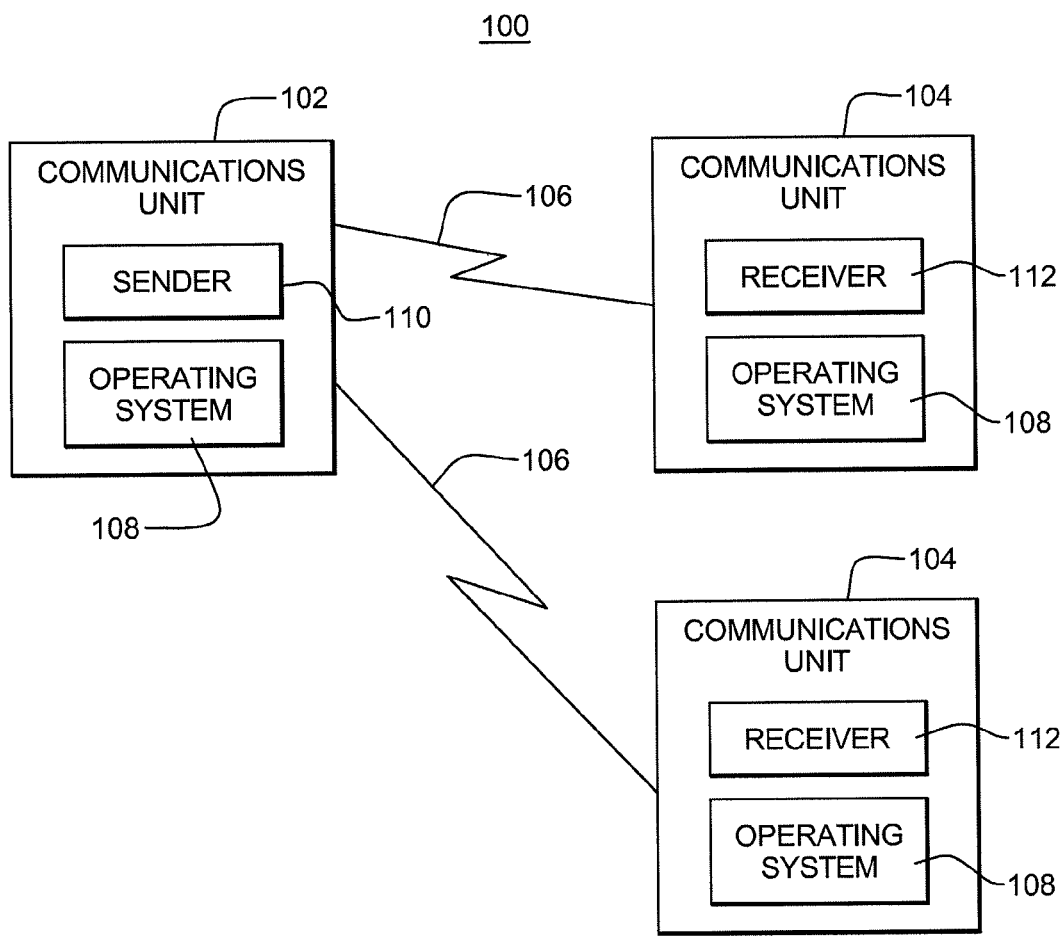
FIG. 1 depicts one example of a communications environment to incorporate and use one or more aspects of the present invention.

One embodiment of a communications environment to incorporate and use one or more aspects of the present invention is described with reference to FIG. 1. A communications environment 100 may include, for instance, a communications unit 102 coupled to a plurality of other communications units 104 via one or more connections 106. A communications unit may include, for instance, a personal computer, a laptop, a handheld unit, a workstation, a mainframe, a mini computer, a node or any other type of unit capable of sending and/or receiving e-mails or other communications. Communications unit 102 may or may not be the same type of communications unit as communications units 104. Additionally, each of communications units 104 may or may not be the same type of unit as another communications unit 104. The connections coupling the units are, for instance, any type of network connection, such as an internet connection, a local area network (LAN), a wide area network (WAN); a token ring; an Ethernet connection, etc.

Each communications unit 102, 104 executes, for example, an operating system 108, such as, for instance, AIX®, offered by International Business Machines Corporation, Armonk, N.Y.; Linux; Windows®; or other operating systems, etc. (AIX® and IBM® are registered trademarks of International Business Machines Corporation, Armonk, N.Y., U.S.A. Windows® is a registered trademark of Microsoft Corporation, Redmond, Wash.) The operating system of one communications unit may be the same or different from another communications unit. Further, in other examples, one or more of the communications units may not include an operating system. Although three (3) communications units are depicted in FIG. 1, more or less units may be included. In one example, communications unit 102 is communicatively coupled to a number of communications units.

Communications unit 102 includes, for instance, a sender 110, which sends communications to one or more communications units 104. In this example, each of communications units 104 includes a receiver 112 that receives and may respond to the communications received from sender 110.

To communicate between a sender and a receiver, the sender prepares a communication (e.g., a note, a message, etc.) to be sent to the receiver. In one example, in which messages are sent between users within the framework of an electronic communication, a syntax is provided for these messages. One example of such a syntax is provided by a network working group Request For Comments (RFC) 2822 document, hereinafter RFC2822, from Qualcomm Inc., published April 2001, which is hereby incorporated herein by reference in its entirety.

In the context of electronic mail, RFC2822 messages are viewed as having an envelope and contents. The envelope includes whatever information is needed to accomplish transmission and delivery. The contents include the object to be delivered to the recipient. The above mentioned standard effects the format and some of the semantics of message content, but does not contain any information pertaining to the envelope. Under this standard, messages are passed by the help of header fields which have similar structures and are composed of a field name separated from a field body by a colon.

One example of a communication is depicted in FIG. 2A. In this example, a communication 200 is an e-mail communication that includes a plurality of header fields, including, for instance, a To: field 202 indicating one or more identities (e.g., e-mail addresses) to which the communication is to be sent; a cc: field 204 indicating zero or more recipients that are to be carbon copied; a bcc: field 206 indicating zero or more recipients that are to be blind carbon copied; a subject field 208, optionally indicating the subject; and a message id: field 209 representing a unique message identifier. The communication also includes a message 210. A communication may include more, less or different information than described above. Further, although in the example described herein the communication is an e-mail and the identities are e-mail addresses, other forms of communications and/or identities can be used and benefit from one or more aspects of the present invention.

In response to sending the communication, the sender may receive an indication that one or more of the identities provided in the communication (e.g., in the To:, cc:, and/or bcc:) are incorrect. For example, as shown in FIG. 2B, an undeliverable notification 220 is provided, which includes, for instance, the original note 221, along with some additional information. For instance, returned note 220 includes a To: field 222 indicating the sender of the original communication that includes the error; a From: field 224 indicating the sender of the delivery notification; a Subject: field 226 indicating the address that did not receive the communication; a Content-Type field 228 providing various details regarding the communication; as well as other additional information.

Another example of a failure notification is depicted in FIG. 2C. As shown, a failure notification 250 also includes a To: field 252 indicating the sender of the original communication; a From: field 254 indicating the sender of the delivery notification; a Subject: field 256 indicating the address that did not receive the communication; a Content-Type field 258 providing various details regarding the communication; as well as other additional information. Additionally, failure notification 250 includes the original note 260. In this example, the original note includes an X-Addr-List: field 262 indicating where the recipients' identities were obtained (this information is retained in the note, as opposed to the other embodiment (FIG. 2B) where the information is retained by the client).

The X-Addr-List, in one embodiment, leverages the RFC2822 Internet Request For Comment's (International Standard) feature for "roll your own" header records. As one example, the X-Addr-List identifies where the recipient(s) address was obtained. For example, recipients "Mary Smith", "Jack Smith", and "John Brown" were obtained from a distribution list (sec-list) that resides on a server (server1.charter.net), "John Doe" and "Lisa Riley" were in a distribution list on the sender's local address book (my-list@local), "Fred Blue" is not part of a distribution list, but is in the sender's local address book (@local), and "Steve Wolf"

is not part of any distribution list or in the sender's address book (hence, he is not listed in X-Addr-List).

In response to receiving a failure indication, the sender may wish to correct the incorrect identities in the one or more repositories that maintain the identities. In accordance with an aspect of the present invention, this corrective action is initiated automatically.

One embodiment of an overview of the logic to automatically initiate corrective action is described with reference to FIG. 3. In this example, the identities are e-mail addresses; however, in other examples, the identities can be other than e-mail addresses. Also, in this particular example, a failure notification, such as the one depicted in FIG. 2B, is provided.

Figure 3:
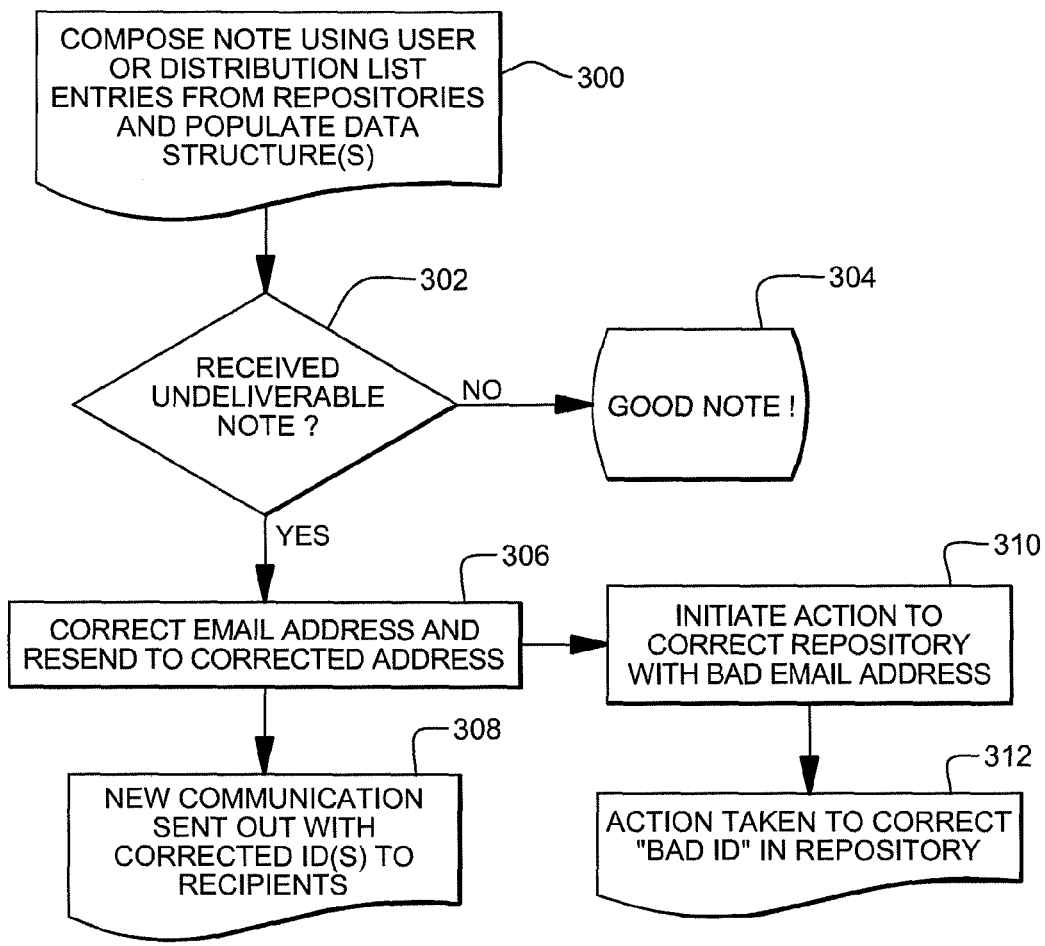
FIG. 3 depicts one embodiment of an overview of the logic to detect an identity is incorrect and to initiate corrective action, in accordance with an aspect of the present invention.

Referring to FIG. 3, initially, a communication is created that specifies one or more receivers, STEP 300. For example, e-mail addresses may be typed in or selected from canned distribution lists. As another example, a name or other designation can be entered in its entirety or with the aid of an auto-fill feature. For instance, if the recipient is Mary Smith by typing in Mary Sm, the auto-fill feature of the e-mail client software may fill in Mary Smith.

When specifying the recipient other than by typing in the actual e-mail address (e.g., userxyz@somewhere.com), a resolution procedure is used to resolve the name or other designation to a usable e-mail address. During this process, typically, a look-up is performed in a local repository (e.g., local address book) for the designation. If it is not there, the search is expanded to a shared repository (such as Lotus® Domino®, an LDAP directory, or others). The user composing the communication has read permission to the repository and may or may not have write permission. When the lookup is successful, an entry is obtained that includes information corresponding to the recipient, including the recipient's e-mail address. This information is used to send the e-mail to the recipient.

In accordance with an aspect of the present invention, the e-mail client creates a history of where the identities were derived and maintains this history in a data structure, such as a table. For example, for each e-mail sent, the client e-mail software creates an indexed log record. As an example, the unique message-id 209 associated with the e-mail is extracted and recorded as a keyed index for the e-mail. Further, the to:, cc: and bcc: e-mail addresses are recorded. Examples of this information are depicted in the below history table (i.e., Cols. 1 and 2, respectively):

address for S. Wolf was typed in, as well as for user12. If resolved, the identity of the associated repository is also indicated (see Col. 4).

Various record retention policies can be established for how long it is necessary or desired to maintain the records. Such settings are a candidate for user preference or enterprise policy.

Continuing with FIG. 3, after sending the communication, a determination is made as to whether an undeliverable note or indication was received by the sender (e.g., back at the composing user's e-mail client), INQUIRY 302. There are various ways of making this determination. For example, a message or Delivery Failure Report may be returned that indicates an error. In one specific example, an undeliverable indication may be identified by a status code provided in the report. There may be many status codes. One known set of status codes is referred to as the Delivery Status Notification (DSN) status codes provided in a network working group Request for Comments (RFC) 3464 document, hereinafter RFC3464, from Qualcom, Inc., published January 2003, which is hereby incorporated herein by reference in its entirety. The status codes identify the reasons for the inability to deliver the note. As a further example, if the remote message transfer agent (MTA) does not support DSN, then the originator's client e-mail software (or other communication software) can parse the rejection notification looking for a specific reply code, such as reply code 550 or other reply code, that indicates failure.

If an undeliverable indication has not been received, then the e-mail addresses are assumed correct, STEP 304. However, if an undeliverable indication is received, then one or more actions may be taken, STEP 306.

As one example, the e-mail address is corrected, if known, and the undelivered communication is resent to the intended recipient using the corrected e-mail address, STEP 306, 308. This new e-mail address can be manually typed in or selected from a list that has been updated with the correct address, as examples.

In another example, the corrected address is sent to other recipients of the original communication informing those recipients of the error and the correction. As an example, a short informational header record is architected that is used to send the incorrect/correct address (value pairs) to each of the co-recipients of the original note (e.g., to:, cc:, bcc:) informing them of the corrected distribution so as to lessen contin-

| Message ID (message identifier) | Recipient Email Address (someuser@xxx.com) | Recipient Email Address Source 0 = typed 1 = resolved | Directory (where resolved) |
|---|---|---|---|
| msg0087@local.machine.example | mary@example.net | 1 | sec-list@server1.charter.net |
| | jack@example.net | 1 | sec-list@server1.charter.net |
| | jbrown@nowheres.org | 1 | sec-list@server1.charter.net |
| | doej@example.net | 1 | my-list@local |
| | lriley@somewhere.org | 1 | my-list@local |
| | fblue@example.net | 1 | @local |
| | swolf@anywhere.net | 0 | n/a (user input/typed entry) |
| msg0052@local.machine.example | user22@us.ibm.com | 1 | distlistdeptxyz@D03NM115/03/M/IBM |
| | user12@gmail.com | 0 | n/a (user input/typed entry) |

Further, in one example, for each entry, an indication is provided as to whether the e-mail address was typed in or repository-resolved (see Col. 3). In the example above, the ued propagation of the incorrect address. One embodiment of this capability is described in U.S. patent application Ser. No. 11/463,340, entitled "Source Initiated Autonomic Recipient Email Address Correction Redistribution," filed Aug. 9, 2006, which is hereby incorporated herein by reference in its entirety.

In addition to the above, or alternatively, action is initiated to correct the repository, if any, that includes the incorrect e-mail address, STEP 310. In one example, this corrective action is initiated automatically, in response to receiving an indication of an incorrect e-mail address, as described further below. In response to initiating corrective action, corrective action may be taken to correct the incorrect address in the repository, STEP 312. The manner in which corrective action is taken depends on, for instance, the mail client and the repository. For example, if the mail client is Lotus Notes® and the repository is a Lotus® address book, then LotusScript® could be used to perform the actions. Other examples are also possible. Lotus Notes®, Lotus®, and LotusScript® are registered trademarks of International Business Machines Corporation.

Figure 4:
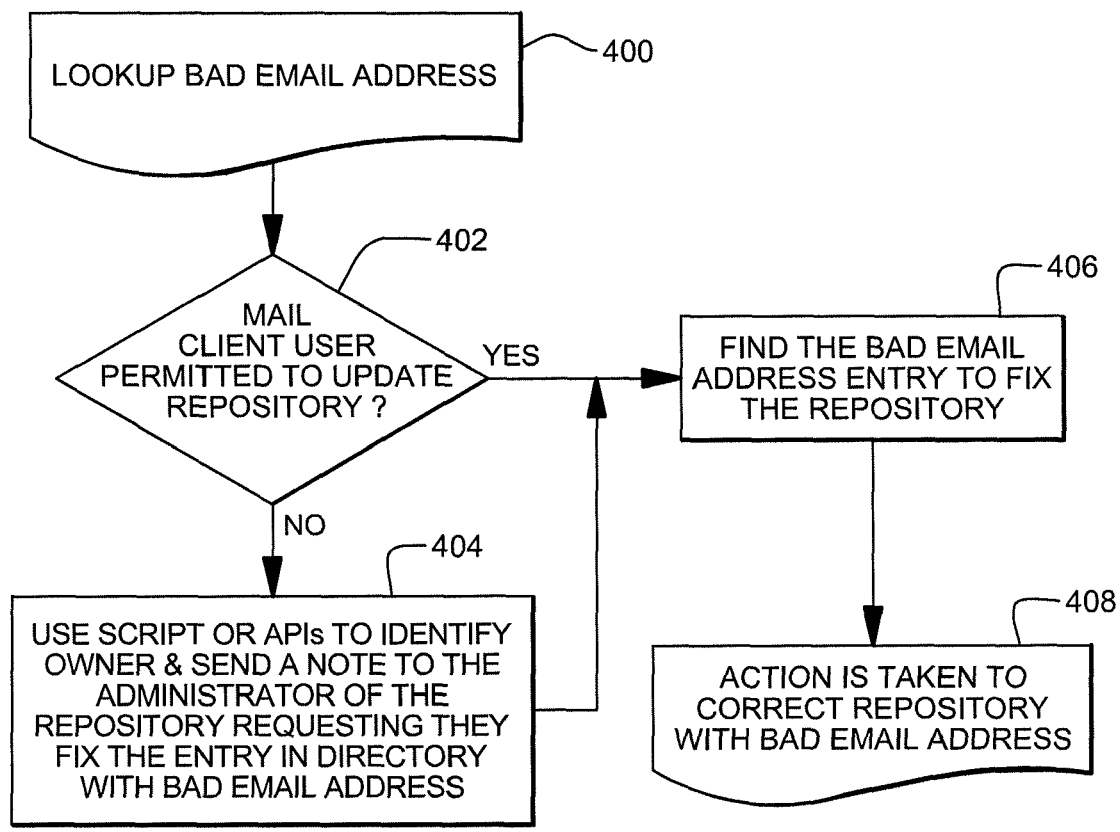
FIG. 4 depicts one embodiment of further details associated with initiating corrective action, in accordance with an aspect of the present invention.

Further details regarding initiating and taking corrective action are described with reference to FIGS. 4 and 5. Referring initially to FIG. 4, the incorrect e-mail address is looked up in the history data structure to obtain pertinent information about the address and determine how to proceed, STEP 400. For example, the message id (e.g., message-id 209) in the returned note is extracted and used as an index to the data structure to obtain the history. From this history, it is determined whether the incorrect e-mail address was typed in. If so, in one example, the e-mail client caches or records the erroneous address and warns the user from retyping it in the future. However, if it is not a typed-in address, but one that was obtained or resolved from a repository, then corrective action may be initiated.

A determination is made as to whether the sender of the communication is permitted to update the repository, INQUIRY 402. In one example, this is determined by obtaining the repository id from the history data structure and then checking an authorization data structure or the like to determine the administrator (e.g., owner) of the repository and the authorization rights. If the sender is not authorized, then, in one embodiment, a notification is automatically generated to the administrator informing the administrator of the error, STEP 404. As an example, a script or application programming interface (API) is used to identify the administrator and send a note to the administrator.

At this point, the administrator can do nothing or, in one embodiment, can take corrective action, in accordance with an aspect of the present invention. In the example herein, it is assumed that the administrator is taking corrective action.

Subsequent to informing the administrator or if the sender is permitted to update the repository, INQUIRY 402, then the incorrect e-mail address entry is located, as described below, in order to revise the repository, STEP 406. In response thereto, action is taken to correct the repository, STEP 408. Further details regarding locating the incorrect e-mail address entry and taking corrective action are described with reference to FIG. 5.

Figure 5:
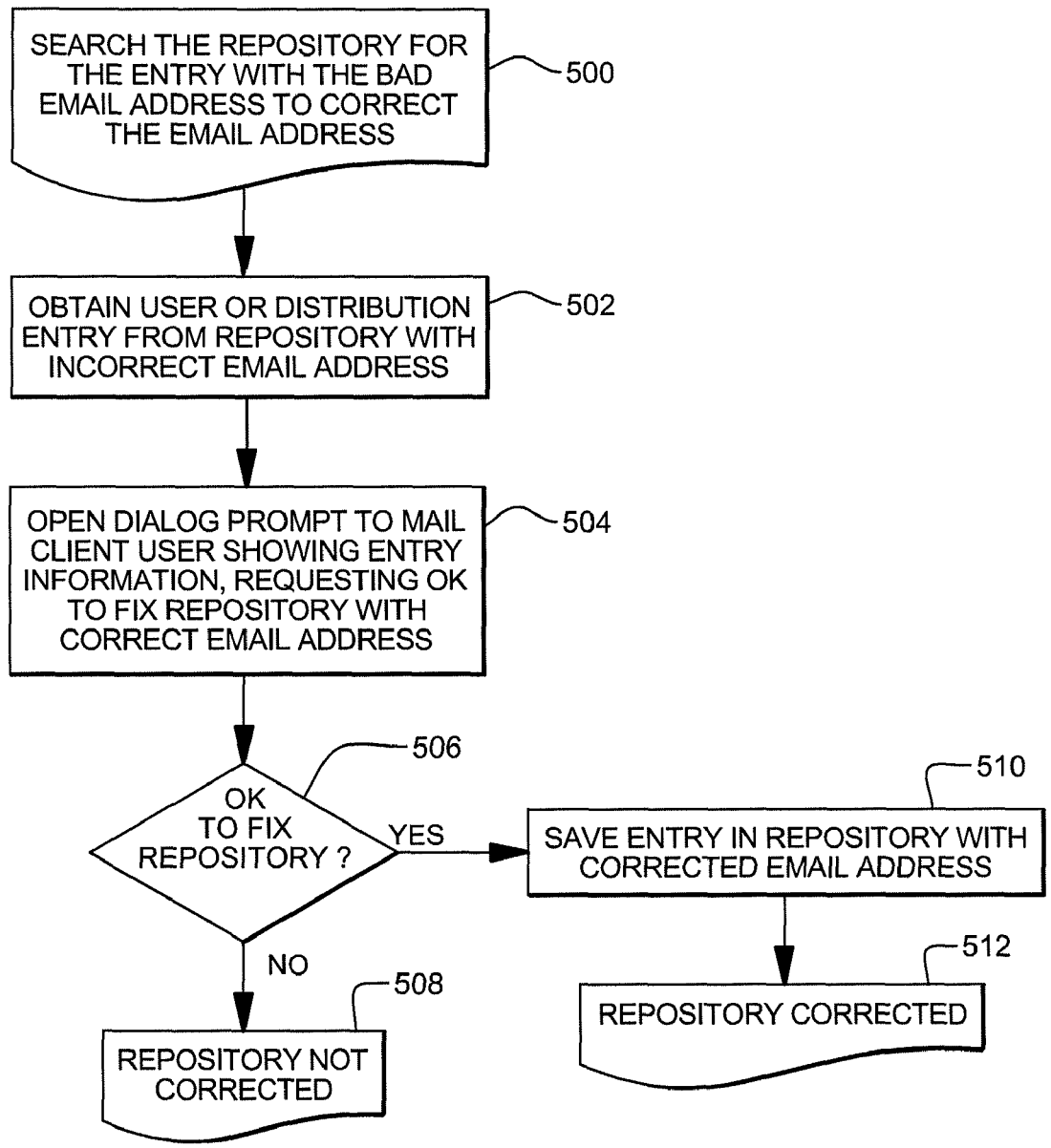
FIG. 5 depicts one embodiment of further details associated with taking corrective action, in accordance with an aspect of the present invention.

Referring to FIG. 5, in one embodiment, the repository, identified from the history data structure using the message id as an index, is searched for the entry with the incorrect address, STEP 500. The incorrect address is used as an index into the repository. That entry is obtained, STEP 502, and an open dialog prompt is provided to the sender or administrator showing information from the entry and requesting approval to fix the repository with the correct e-mail address, STEP 504. As examples, the approval is provided implicitly absent explicit authorization or explicitly. If the approval is not provided, INQUIRY 506, then the repository is not corrected, STEP 508, and processing terminates. However, if the request to correct the repository is approved, then the entry is saved in the repository with the corrected e-mail address, STEP 510. In one example, LDAP or APIs specific to the particular mailer used (e.g., Lotus Notes®, Microsoft® Outlook, etc.) are employed to update the repository with the correct address, STEP 512. This completes processing.

Described in detail above is one embodiment of detecting (e.g., automatically) an incorrect identity in a communication, automatically initiating corrective action, in response to the detection, and taking corrective action to correct the identity maintained in a repository. The actions taken (e.g., update the repository) can be automatic or manual.

In a further example, the data structure (e.g., table) is not used, but instead, the X-Addr-List is embedded in a header record of a sent communication, and provided in a failure notification, such as the one depicted in FIG. 2C. Therefore, the directory information is self-contained in the failure notification report, and a table look-up, etc., is not needed.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 6:
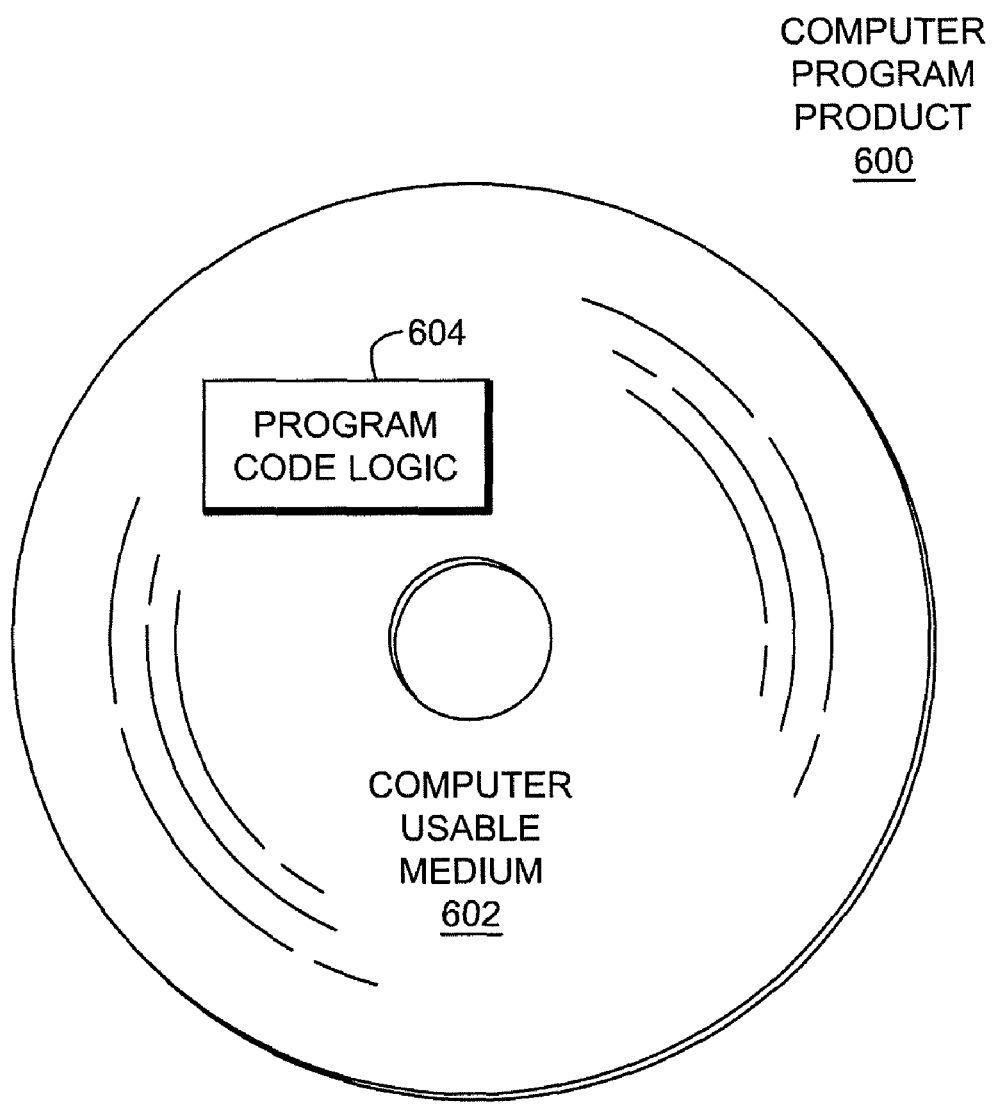
FIG. 6 depicts one embodiment of a computer program product incorporating one or more aspects of the present invention.

One example of an article of manufacture or a computer program product incorporating one or more aspects of the present invention is described with reference to FIG. 6. A computer program product 600 includes, for instance, one or more computer usable media 602 to store computer readable program code means or logic 604 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided in which corrective action to update repositories that include incorrect identities (e.g., e-mail addresses, addresses of buddies in a buddy list or other addresses or indications of a recipient) is automatically initiated in response to detecting an incorrect identity. This enables the repository to be updated so that the error does not continue to occur and does not get propagated.

Although various embodiments are described above, these are only examples. For example, identities included in other areas of the communication, such as the body or subject, etc., can also be checked for correctness and corrected, as described herein.

Further, as an example, the communications environment described above is only one example. There can be more or less communication units than described above. Also, the units can be different than that described above. As one particular example, the communications unit to send a communication may be a cell phone or other mobile device. Many other examples are also possible.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In addition to the above, other changes may be made without departing from the spirit of the present invention. For example, the identity that is identified as being incorrect may be in the body of the message instead of the To:, cc:, or bcc: fields. Further, the communications that are described herein are just examples and many other communications may incorporate and use one or more aspects of the present invention. Further, although the examples described herein are for e-mail communications, again, the communications may be for other types of communication systems.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating correction of identities indicated in communications, said method comprising:
   creating a derivation history, the derivation history tracking whether identities in the communications are repository-derived, and for each repository-derived identity, identifying a repository of multiple repositories from which the repository-derived identity was resolved;
   subsequently determining that an identity specified in a communication sent by a sender to one or more receivers is an incorrect identity maintained in one repository of the multiple repositories, the incorrect identity having been resolved from the one repository in which the incorrect identity is maintained, during an address resolution procedure to resolve the identity specified in the communication; and
   automatically initiating, by a processor, correction of the incorrect identity in the one repository in which the incorrect identity is maintained, the automatically initiating correction comprising:
   obtaining information in a failure notification indicating a delivery failure of the communication;
   determining whether the incorrect identity was resolved from the one repository of the multiple repositories during an address resolution procedure;
   responsive to determining that the incorrect identity was resolved from the one repository during an address resolution procedure, using the obtained information and the derivation history to obtain the identity of the one repository from which the incorrect identity was resolved, and in which the incorrect identity is maintained and is to be corrected; and
   wherein the automatically initiating includes providing information relating to the incorrect identity to one or more parties creating the derivation history.

2. The method of claim 1, wherein the communication is an e-mail and the incorrect identity is an e-mail address.

3. The method of claim 1, wherein the one or more parties comprises the sender of the communication.

4. The method of claim 1, wherein the automatically initiating comprises:
   determining a party authorized to update the one repository;
   providing information relating to the incorrect identity to the authorized party; and
   obtaining approval to update the one repository.

5. The method of claim 4, wherein the obtaining approval is implicit and granted absent explicit authorization by the authorized party.

6. The method of claim 4, wherein the providing information includes locating an entry in said one repository corresponding to said incorrect identity, said locating using said incorrect identity, and obtaining information from the entry corresponding to the incorrect identity.

7. The method of claim 4, further comprising updating the one repository, in response to obtaining approval, wherein the updating comprises revising the incorrect identity to provide a correct identity.

8. The method of claim 1, wherein the obtained information comprises:

a message identifier, wherein the using the obtained information comprises using the message identifier as an index to the derivation history to identify the one repository.

9. The method of claim 1, wherein the sender of the communication comprising the incorrect identity creates the derivation history.

10. A computer system for facilitating correction of identities indicated in communications, said computer system comprising:

a memory; and
a processor, in communications with the memory, wherein the computer system is configured to perform a method, said method comprising:
creating a derivation history, the derivation history tracking whether identities in the communications are repository-derived, and for each repository-derived identity, identifying a particular repository of multiple repositories from which the repository-derived identity was resolved;
subsequently determining that an identity specified in a communication sent by a sender to one or more receivers is an incorrect identity maintained in one repository of the multiple repositories, the incorrect identity having been resolved from the one repository in which the incorrect identity is maintained, during an address resolution procedure to resolve the identity specified in the communication; and
automatically initiating, by a processor, correction of the incorrect identity in the one repository in which the incorrect identity is maintained, the automatically initiating correction comprising:
obtaining information in a failure notification indicating a delivery failure of the communication;
determining whether the incorrect identity was resolved from the one repository of the multiple repositories during an address resolution procedure;
responsive to determining that the incorrect identity was resolved from the one repository during an address resolution procedure, using the obtained information and the derivation history to obtain the identity of the one repository from which the incorrect identity was resolved, and in which the incorrect identity is maintained and is to be corrected; and
wherein the automatically initiating includes providing information relating to the incorrect identity to one or more parties creating the derivation history.

11. The computer system of claim 10, wherein the automatically initiating comprises:
determining a party authorized to update the one repository;
providing information relating to the incorrect identity to the authorized party; and
obtaining approval to update the one repository.

12. The computer system of claim 11, wherein the providing information includes locating an entry in said one repository corresponding to said incorrect identity, said locating using said incorrect identity, and obtaining information from the entry corresponding to the incorrect identity.

13. A computer program product for facilitating correction of identities indicated in communications, the computer program product comprising:
a non-transitory storage medium readable by a processor and storing instructions for execution by the processor for performing a method comprising:
creating a derivation history, the derivation history tracking whether identities in the communications are repository-derived, and for each repository-derived identity, identifying a particular repository of multiple repositories from which the repository-derived identity was resolved;
subsequently determining that an identity specified in a communication sent by a sender to one or more receivers is an incorrect identity maintained in one repository of the multiple repositories, the incorrect identity having been resolved from the one repository in which the incorrect identity is maintained, during an address resolution procedure to resolve the identity specified in the communication; and
automatically initiating, by a processor, correction of the incorrect identity in the one repository in which the incorrect identity is maintained, the automatically initiating correction comprising:
obtaining information in a failure notification indicating a delivery failure of the communication;
determining whether the incorrect identity was resolved from the one repository of the multiple repositories during an address resolution procedure;
responsive to determining that the incorrect identity was resolved from the one repository during an address resolution procedure, using the obtained information and the derivation history to obtain the identity of the one repository from which the incorrect identity was resolved, and in which the incorrect identity is maintained and is to be corrected; and
wherein the automatically initiating includes providing information relating to the incorrect identity to one or more parties creating the derivation history.

14. The computer program product of claim 13, wherein the automatically initiating comprises:
determining a party authorized to update the one repository;
providing information relating to the incorrect identity to the authorized party; and
obtaining approval to update the one repository.

15. The computer program product of claim 14, wherein the providing information includes locating an entry in said one repository corresponding to said incorrect identity, said locating using said incorrect identity, and obtaining information from the entry corresponding to the incorrect identity.

16. The computer program product of claim 14, wherein the method further comprises updating the one repository, in response to obtaining approval.

\* \* \* \* \*